United States Patent
Said et al.

(10) Patent No.: US 10,390,048 B2
(45) Date of Patent: Aug. 20, 2019

(54) EFFICIENT TRANSFORM CODING USING OPTIMIZED COMPACT MULTI-PASS TRANSFORMS

(71) Applicant: QUALCOMM Incorporated, San Diego, CA (US)

(72) Inventors: Amir Said, San Diego, CA (US); Xin Zhao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 15/432,633

(22) Filed: Feb. 14, 2017

(65) Prior Publication Data
US 2017/0238019 A1    Aug. 17, 2017

Related U.S. Application Data

(60) Provisional application No. 62/295,448, filed on Feb. 15, 2016.

(51) Int. Cl.
*H04N 7/12* (2006.01)
*H04N 19/70* (2014.01)
(Continued)

(52) U.S. Cl.
CPC .......... *H04N 19/70* (2014.11); *H04N 19/124* (2014.11); *H04N 19/439* (2014.11); *H04N 19/60* (2014.11);
(Continued)

(58) Field of Classification Search
CPC .... H04N 19/124; H04N 19/439; H04N 19/60; H04N 19/61; H04N 19/70; H04N 19/91
See application file for complete search history.

(56) References Cited

U.S. PATENT DOCUMENTS 7,502,743 B2   3/2009  Thumpudi et al.
8,321,207 B2   11/2012 Edler et al.
(Continued)

FOREIGN PATENT DOCUMENTS

CN   102811111 A   12/2012

OTHER PUBLICATIONS

Chen, H., et al.,"New Transforms Tightly Bounded by DCT and KLT," IEEE Signal Processing Letters, vol. 19, No. 6 Jun. 1, 2012 pp. 344-347 (Year: 2012).*

(Continued)

*Primary Examiner* — Jessica M Prince
(74) *Attorney, Agent, or Firm* — Shumaker & Sieffert, P.A.

(57) ABSTRACT

As part of a video encoding or decoding process, a device applies a transformation to input data elements to derive output data elements for a current block. The transformation comprises a sequence of vector transformations. For each respective vector transformation of the sequence of vector transformations other than a first vector transformation of the sequence of vector transformations, input values for the respective vector transformation comprise output values of the respective previous vector transformation of the sequence of vector transformations. Each respective vector transformation of the sequence of vector transformations further takes, as input, a respective parameter vector for the respective vector transformation, the respective parameter vector for the respective vector transformation comprising one or more parameters.

26 Claims, 10 Drawing Sheets

(51) Int. Cl.
H04N 19/124 (2014.01)
H04N 19/61 (2014.01)
H04N 19/91 (2014.01)
H04N 19/60 (2014.01)
H04N 19/42 (2014.01)

(52) U.S. Cl.
CPC ............ *H04N 19/61* (2014.11); *H04N 19/91* (2014.11); *G06T 2207/20048* (2013.01)

(56) References Cited

U.S. PATENT DOCUMENTS

| | | |
|---|---|---|
| 9,271,221 B2 | 2/2016 | Tong et al. |
| 2006/0010188 A1* | 1/2006 | Solomon ............... G06F 17/142 708/400 |
| 2012/0008675 A1* | 1/2012 | Karczewicz ......... H04N 19/159 375/240.02 |
| 2017/0238013 A1 | 8/2017 | Said et al. |
| 2017/0238014 A1 | 8/2017 | Said et al. |

OTHER PUBLICATIONS

Second Written Opinion from International Application No. PCT/US2017/017940, dated Jan. 23, 2018, 8 pp.
International Preliminary Report on Patentability from International Application No. PCT/US2017/017940, dated May 23, 2018, 29 pp.
Response to Written Opinion dated Apr. 12, 2017, from International Application No. PCT/US2017/017940, filed on Dec. 15, 2017, 21 pp.
Chen H., et al., "New Transforms Tightly Bounded by DCT and KLT," IEEE Signal Processing Letters, vol. 19, No. 6, Jun. 1, 2012, pp. 344-347.
Cintra R.J., et al., "Energy-Efficient 8-Point DCT Approximations: Theory and Hardware Architectures," Circuits, Systems and Signal Processing, vol. 35, No. 11, Dec. 30, 2015, pp. 4009-4029.
International Search Report and Written Opinion of International Application No. PCT/US2017/017940, dated Apr. 12, 2017, 16 pp.
Mandyam G., et al., "Lossless Image Compression Using the Discrete Cosine Transform," Journal of Visual Communication and Image Representation, vol. 8, No. 1, Mar. 1, 1997, retrieved on Mar. 6, 1995, pp. 21-26.
Parfieniuk M., "Using the CS Decomposition to Compute the 8-Point DCT," IEEE International Symposium on Circuits and Systems (ISCAS), May 1, 2015, pp. 2836-2839.
Zhu S., et al., "In Search of "Better-than-DCT" Unitary Transforms for Encoding of Residual Signals," IEEE Signal Processing Letters, vol. 17, No. 11, Nov. 1, 2010, pp. 961-964.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T Rec. H.261 (Dec. 1990), "Line Transmission on Non-Telephone Signals, Video Codec for Audiovisual Services AT p x 64 kbit/s", Dec. 1990, 32 pp.
ITU-T H.263, Series H: Audiovisual and Multimedia Systems, Infrastructure of audiovisual services—Coding of moving video, Video coding for low bit rate communication, Jan. 2005, 226 pp.
ITU-T Rec. H.262 (Jul. 1995), "Transmission on Non-Telephone Signals, Information Technology—Generic Coding of Moving Pictures and Associated Audio Information: Video", Jul. 1995, 211 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Sullivan G., Overview of the High Efficiency Video Coding (HEVC) Standard, IEEE Transactions on Circuits and Systems for Video Technology, vol. 22, No. 12, pp. 1649-1668, Dec. 2012.
Ye Y., Improved H.264 Intra Coding Based on Bi-Directional Intra Prediction, Directional Transform, and Adaptive Coefficient Scanning, in Proc. IEEE Int. Conf. Image Process., San Diego, CA, Oct. 2008, pp. 2116-2119.
Wien M., "High Efficiency Video Coding", Coding Tools and Specification, Springer-Verlag, Berlin, 2015, 30 pp.
Said A., "Highly Efficient Non-Separable Transforms for Next Generation Video Coding", 2016 Picture Coding Symposium (PCS): Nuremberg, Germany, Dec. 4-7, 2016; IEEE, pp. 1-5.
Zhao X., EE1: Improvements on non-separable secondary transform, Joint Video Exploration Team (JVET) of ITU-T SG16 WP3 and ISO/IEC JTC1/SC29/WG11 4th Meeting: Chengdu, CN, JVET-D0120, Oct. 15-21, 2016, 5 pp.
Britanak V., et al., "Discrete Cosine and Sine Transforms: General Properties, Fast Algorithms and Integer Approximations," Academic Press, Apr. 2007, pp. 16-38.
Zhao X., et al., "TU-level non-separable secondary transform", Joint Video Exploration Team (JVET) of ITU-T SG16 WP3 and ISO/IEC JTC1/SC29/WG11 2nd Meeting: San Diego, USA, Feb. 20-26, 2016, JVET-B0059, 5 pp.
Zhao X., et al., "EE2.7: TU-level non-separable secondary transform", Joint Video Exploration Team (JVET) of ITU-T SG16 WP3 and ISO/IEC JTC1/SC29/WG11 3rd Meeting: Geneva, CH, May 26-Jun. 1, 2016, JVET-C0053_v3, 10 pp.
Takamura S., et al., "On Intra Coding Using Mode Dependent 2D-KLT", in Proc 30th Picture Coding Symp, San Jose CA, Dec. 2013, pp. 137-140.
Sezer, O.G., et al., "Approximation and Compression with Sparse Orthonormal Transforms", IEEE Transactions on Image Processing, vol. 24, No. 8, Aug. 2015, pp. 2328-2343.
Egilmez, H., et al., "Graph-Based Transforms for Inter Predicted Video Coding" in Proc IEEE int. Conf. Image Process., Quebec City, Canada, Sep. 2015, pp. 3992-3996.
Doganata, Z., et al., "General Synthesis Procedures for FIR Lossless Transfer Matrices, for Perfect-Reconstruction Multirate Filter Bank Applications", IEEE Transactions on Acoustics, Speech, and Signal Processing, vol. 36, No. 10, Oct. 1988, pp. 1561-1574.
P.P Vaidyanathan, "14.6.1 Factorization of Real Unitary Matrices Using Givens Rotations," Chapter 14, Multirate Systems and Filter Banks, Prentice Hall Signal Processing Series, 1993, pp. 747-750.
Alshina E., et al., "Description of Exploration Experiments on Coding Tools", Joint Video Exploration Team (JVET) of TU-T SG16 WP3 and ISO/IEC JTC1/SC29/WG11 2nd Meeting: San Diego, USA, Feb. 20-26, 2016, JVET-B1011, Feb. 26, 2016, 5 pp.
Huang H., et al., "EE2.1: Quadtree plus binary tree structure integration with JEM tools", Joint Video Exploration Team (JVET) of ITU-T SG16 WP3 and ISO/IEC JTC1/SC29/WG11 3rd Meeting: Geneva, CH, May 26-Jun. 1, 2016, JVET-O0024, May 16, 2016, 5 pp.
Suehring, K, et al., "JVET common test conditions and software reference configurations", Joint Video Exploration Team (JVET) of ITU-T SG16 WP3 and ISO/IEC JTC1/SC29/WG11 2nd Meeting: San Diego, USA Feb. 20-26, 2017, JVET-B1010, Apr. 4, 2016, 4 pp.
Zhao X., et al., "EE2.7 related: Improved non-separable secondary transform", Joint Video Exploration Team (JVET) of ITU-T SG16 WP3 and ISO/IEC JTC1/SC291/WG11 3rd Meeting: Geneva, CH, May 26-Jun. 1, 2016, JVET-O0063, May 17, 2016, 3 pp.
Alshina E., et al., "Description of Exploration Experiments on Coding Tools", Joint Video Exploration Team (JVET) of ITU-T SG16 WP3 and ISO/IEC JTC1/SC29/WG11 3rd Meeting: Geneva, CH, May 26-31, 2016, JVET-C1011, May 31, 2016, 9 pp.

* cited by examiner $y_i = \cos(\theta)r_i - \sin(\theta)r_j$
$y_j = \cos(\theta)r_j + \sin(\theta)r_i$ $r_i = \cos(\theta)y_i + \sin(\theta)y_j$
$r_j = -\sin(\theta)y_i + \cos(\theta)y_j$

EFFICIENT TRANSFORM CODING USING OPTIMIZED COMPACT MULTI-PASS TRANSFORMS

This application claims the benefit of U.S. Provisional Patent Application 62/295,448, filed Feb. 15, 2016, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

In general, the disclosure describes techniques for transform coding using Compact Multi-Pass Transforms (CMPTs). Transform coding is a part of video coding, such as in the latest standard, High-Efficiency Video Coding (HEVC). The standard may use block transforms that are separable (e.g., horizontal transform and then vertical transform, or vice-versa) and fixed per block size, thus using little memory for implementation.

It may be possible to improve compression using a plurality of sets of non-separable transforms, with compression improvements dependent on the number of available transforms. Having many sets of non-separable transforms may result in having to use too much expensive fast memory to store the parameters defining all those transforms in matrix format. This disclosure describes example techniques for replacing matrix-based transforms. Rather than using matrix-based transforms, this disclosure uses CMPT, which can, in general terms, use less memory and computation as compared to transforms in matrix format.

In one example, this disclosure describes a method of decoding video data, the method comprising: determining, based on syntax elements in a bitstream that comprises an encoded representation of a current picture of the video data, a plurality of data elements for a current block of the current picture; applying a transformation to the data elements to derive residual values for the current block, wherein: the transformation comprises a sequence of vector transformations, input values for a first vector transformation of the sequence of vector transformations comprise the plurality of data elements, output values for a last vector transformation of the sequence of vector transformations comprise the residual values for the current block, for each respective vector transformation of the sequence of vector transformations other than the first vector transformation of the sequence of vector transformations, input values for the respective vector transformation comprise output values of the respective previous vector transformation of the sequence of vector transformations, and each respective vector transformation of the sequence of vector transformations further takes, as input, a respective parameter vector for the respective vector transformation, the respective parameter vector for the respective vector transformation comprising one or more parameters; and reconstructing, based on the derived residual data, samples of the current picture.

In another example, this disclosure describes a method of encoding video data, the method comprising: determining residual values for a current block of a current picture of the video data; applying a transformation to the residual values for the current block to derive a plurality of data elements for the current block, wherein applying the transformation to the residual values for the current block comprises applying a sequence of vector transformations, wherein: the input values for a first vector transformation of the sequence of vector transformations comprise the residual values for the current block, output values of a last vector transformation of the sequence of vector transformations comprise the data elements for the current block, for each respective vector transformation of the sequence of vector transformations other than the first vector transformation of the sequence of vector transformations, input values for the respective vector transformation comprise output values of the respective previous vector transformation of the sequence of vector transformations, each respective vector transformation of the sequence of vector transformations further takes, as input, a respective parameter vector for the respective vector transformation, and the respective parameter vector for the respective vector transformation comprising one or more parameters; and including, in a bitstream that comprises an encoded representation of the current picture, syntax elements having values based on the data elements for the current block.

In another example, this disclosure describes a device for decoding video data, the device comprising: one or more storage media configured to store encoded video data; and a video decoder configured to: determine, based on syntax elements in a bitstream that comprises an encoded representation of a current picture of the video data, a plurality of data elements for a current block of the current picture; apply a transformation to the data elements to derive residual values for the current block, wherein: the transformation comprises a sequence of vector transformations, input values for a first vector transformation of the sequence of vector transformations comprise the plurality of data elements, output values for a last vector transformation of the sequence of vector transformations comprise the residual values for the current block, for each respective vector transformation of the sequence of vector transformations other than the first vector transformation of the sequence of vector transformations, input values for the respective vector transformation comprise output values of the respective previous vector transformation of the sequence of vector transformations, and each respective vector transformation of the sequence of vector transformations further takes, as input, a respective parameter vector for the respective vector transformation, the respective parameter vector for the respective vector transformation comprising one or more parameters; and reconstruct, based on the derived residual data, samples of the current picture.

In another example, this disclosure describes a device for encoding video data, the device comprising: one or more storage media configured to store video data; and a video encoder configured to: determine residual values for a current block of a current picture of the video data; apply a transformation to the residual values for the current block to derive a plurality of data elements for the current block, wherein applying the transformation to the residual values for the current block comprises applying a sequence of vector transformations, wherein: the input values for a first vector transformation of the sequence of vector transformations comprise the residual values for the current block, output values of a last vector transformation of the sequence of vector transformations comprise the data elements for the current block, for each respective vector transformation of the sequence of vector transformations other than the first vector transformation of the sequence of vector transformations, input values for the respective vector transformation comprise output values of the respective previous vector transformation of the sequence of vector transformations, and each respective vector transformation of the sequence of vector transformations further takes, as input, a respective parameter vector for the respective vector transformation, the respective parameter vector for the respective vector transformation comprising one or more parameters; and include, in a bitstream that comprises an encoded representation of the current picture, syntax elements having values based on the data elements for the current block.

The details of one or more examples are set forth in the accompanying drawings and the description below. Other features, objects, and advantages will be apparent from the description, drawings, and claims.

DETAILED DESCRIPTION

Figure 1:
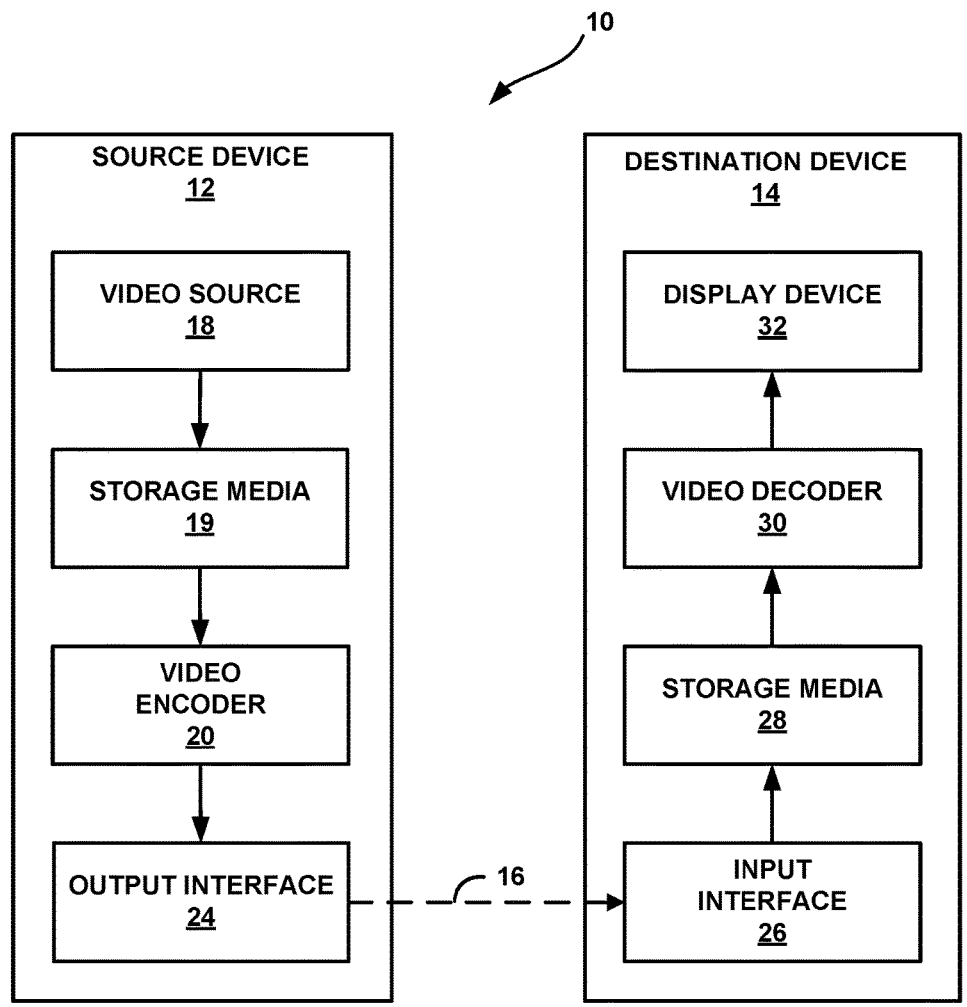
FIG. 1 is a block diagram illustrating an example video encoding and decoding system configured to implement techniques of the disclosure.

This disclosure describes techniques that may solve problems with the advanced application of transform coding, which is a fundamental part of video compression standards. The techniques of this disclosure may reduce memory and computation for large numbers of non-separable transforms, potentially enabling large coding gains with reasonable costs. In the past, several data-adaptive transform techniques had been proposed for video coding, showing very significant coding gains, but with prohibitive complexity. In some instances, the techniques of this disclosure may reduce memory needed, potentially with very little performance loss.

For example, a video encoder may determine residual values for a current block of a current picture of the video data. In this example, the video encoder may apply a transformation to the residual values for the current block to derive a plurality of data elements (e.g., transform coefficients) for the current block. As part of applying the transformation to the residual values for the current block, the video encoder applies a sequence of vector transformations. In this example, the input values for a first vector transformation of the sequence of vector transformations comprise the residual values for the current block. Furthermore, in this example, output values of a last vector transformation of the sequence of vector transformations comprise the data elements for the current block. For each respective vector transformation of the sequence of vector transformations other than the first vector transformation of the sequence of vector transformations, input values for the respective vector transformation comprise output values of the respective previous vector transformation of the sequence of vector transformations. Each respective vector transformation of the sequence of vector transformations further takes, as input, a respective parameter vector for the respective vector transformation, the respective parameter vector for the respective vector transformation comprising one or more parameters. The video encoder may include, in a bitstream that comprises an encoded representation of the current picture, syntax elements having values based on the data elements for the current block.

Similarly, a video decoder may determine, based on syntax elements in a bitstream that comprises an encoded representation of a current picture of the video data, a plurality of data elements (e.g., transform coefficients) for a current block of the current picture. In this example, the video decoder may apply a transformation to the data elements to derive residual values for the current block. The transformation comprises a sequence of vector transformations, which may also be referred to herein as passes. In this example, input values for a first vector transformation of the sequence of vector transformations comprise the plurality of data elements. Output values for a last vector transformation of the sequence of vector transformations comprise the residual values for the current block. In this example, for each respective vector transformation of the sequence of vector transformations other than the first vector transformation of the sequence of vector transformations, input values for the respective vector transformation comprise output values of the respective previous vector transformation of the sequence of vector transformations. Each respective vector transformation of the sequence of vector transformations further takes, as input, a respective parameter vector for the respective vector transformation, the respective parameter vector for the respective vector transformation comprising one or more parameters. The video decoder 30 may reconstruct, based on the derived residual data, samples of the current picture.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable fixed-function and/or programmable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks.

In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU.

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks into one or more transform blocks. For instance, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Transform coding is a fundamental part of all modern video coding standards, like High-Efficiency Video Coding (HEVC) (as described in G. J. Sullivan, J.-R. Ohm, W.-J. Han, and T. Wiegand, "Overview of the High Efficiency Video Coding (HEVC) Standard," *IEEE Trans. Circuits Syst. Video Technol.*, vol. 22, no. 12, pp. 1649-1668, December 2012; M. Wien, *High Efficiency Video Coding: Coding Tools and Specification*, Springer-Verlag, Berlin, 2015). It is known that optimal transform coding should employ the matrix-based Karhunen-Loève Transforms (KLTs) (or similarly adaptive transforms), since they can be optimized to particular signal statistics. However, the matrix implementation tends to require a relatively high number computations and a relatively high amount of memory. In practice fixed separable transforms like the Discrete Cosine Transform (DCT) have been adopted as they may be use fewer computations and memory to implement the transform.

This disclosure describes techniques that enable obtaining coding gains nearly equal to those achieved using KLTs, but with significantly less memory and computation. In some examples, techniques of this disclosure are based on: (a) creating a set of data-specific transforms that can be tested by video encoder 20, and then video encoder 20 may choose the best data-specific transforms (e.g., those that minimize distortion). Video encoder 20 may send (e.g. signal) its index for use by video decoder 30, and (b) a technique to approximate the multiplication of a vector by the transform matrix, called Compact Multi-Pass Transform (CMPT). The techniques of this disclosure may use less memory and computation, as compared to the non-separable matrix based operations, because CMPT techniques are specifically optimized for video coding purposes, and use coding gain estimates to identify unimportant transform parameters and computations. CMPTs allows for many types of implementations, and, as a practical example, an implementation based on a transform approximation technique called Hypercube-Givens Transform (HyGT).

Figure 2:
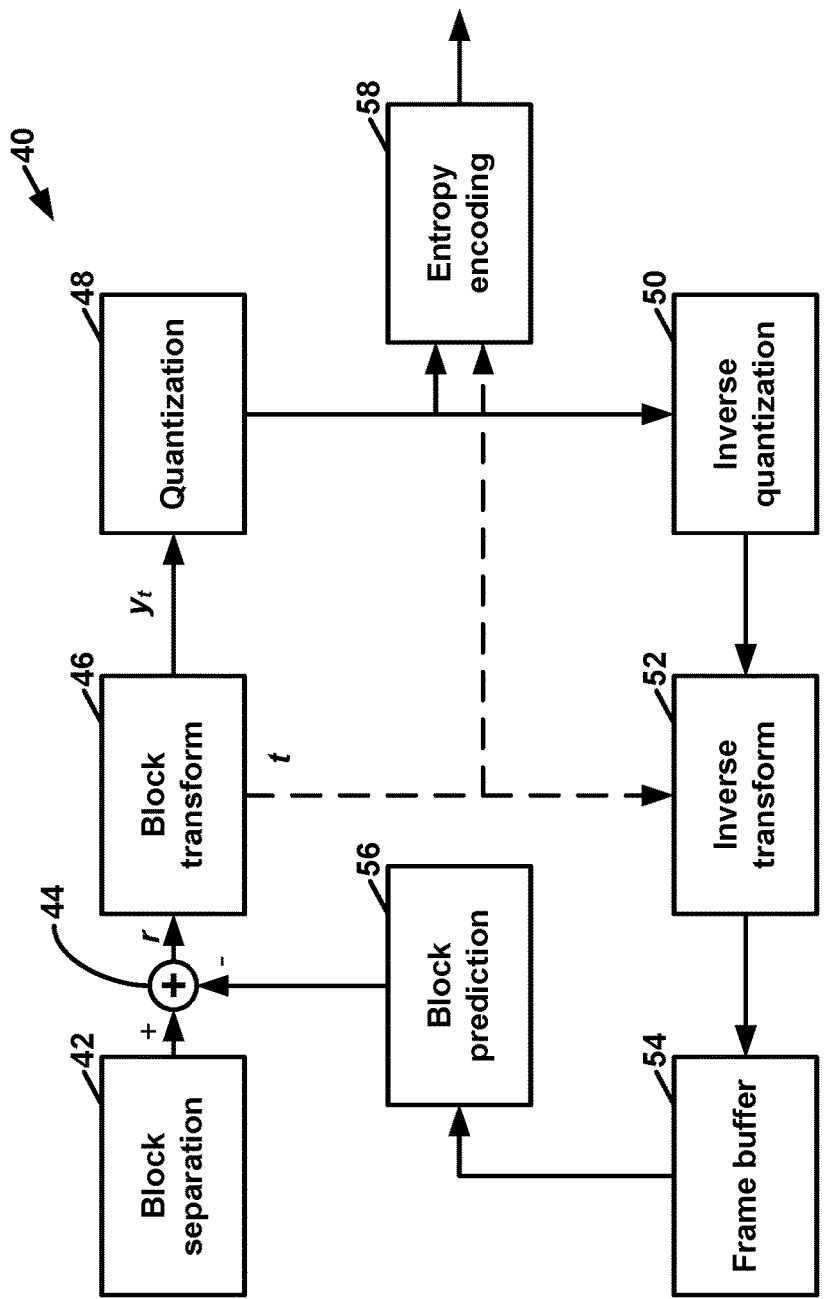
FIG. 2 is a block diagram illustrating an example system for hybrid video encoding with transform selection.

FIG. 2 is a block diagram illustrating an example system 40 for hybrid video encoding with transform selection. Particularly, FIG. 2 shows a diagram of a video encoding system (i.e., a video encoder, such as video encoder 20), where video frames are first divided into pixel blocks (block separation 42). Example types of pixel blocks may include coding blocks for CUs. Furthermore, in FIG. 2, in each block, the video encoder subtracts each pixel value from its predicted value (44). The video encoder numerically transforms the blocks of differences (i.e., residuals) using a linear operation (block transform 46). In the example of FIG. 2, r denotes residual data, $y_t$ denotes transformed residual data, and t denotes an indication of which transform was applied to the residual to generate $y_t$.

A linear transformation can be implemented by matrix-vector multiplications, but video coding applications have been using some special fast transforms that have fixed coefficients derived from trigonometric functions, and that can be computed much more efficiently than the equivalent matrix-vector products. See V. Britanak, P. C. Yip, and K. R. Rao, Discrete Cosine and Sine Transforms: General Properties, Fast Algorithms and Integer Approximations, Academic Press, 2007. This disclosure describes some possible further improvements using CMPT, where sets of vector transformations are used in a pipeline fashion to feed output values generated by a vector transformation to subsequent vector transformation in the pipeline, with each respective vector transformation receiving one or more parameters as inputs in addition to the outputs from previous vector transformation.

In FIG. 2, the video encoder may quantize the transformed residual data (quantization 48) and inverse quantize (inverse quantization 50) the quantized transformed residual data. Furthermore, the video encoder may apply an inverse transform to the inverse quantized transformed residual data (inverse transform 52) to recover the residual data. A frame buffer 54, also called decoded picture buffer (DPB), of the video encoder stores reconstructed pixel blocks determined based on the residual data. The video encoder may use reconstructed pixel blocks stored in frame buffer 54 for prediction of other pixel blocks (block prediction 56). In the example of FIG. 2, the inverse transform applied to the transformed residual data by the video encoder may be determined based on the transform previously applied to generate the transformed residual data. The indication of which transform was applied to generate the transformed residual data may be provided to an entropy encoding unit 58 of the video encoder. The entropy encoding unit 58 may entropy encode a syntax element indicating the transform along with syntax elements indicating the quantized transformed residual data.

Figure 3:
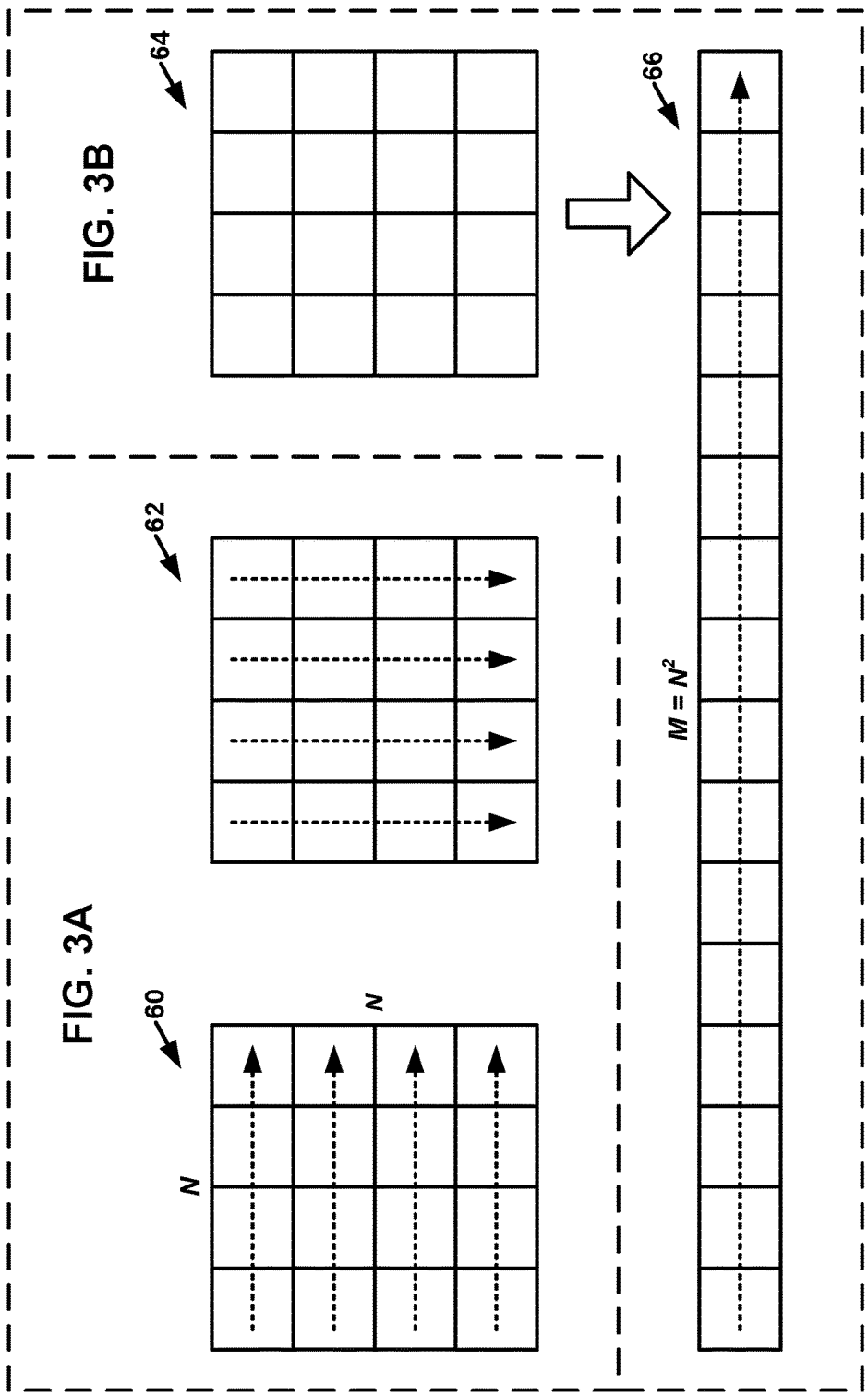
FIG. 3A is a conceptual diagram illustrating an example option for computing separable transforms in a two-dimensional block of pixel residuals.
FIG. 3B is a conceptual diagram illustrating an example option for computing non-separable transforms in a two-dimensional block of pixel residuals.

FIGS. 3A and 3B show example options for applying transforms to a two-dimensional block of video residuals. Particularly, FIG. 3A is a conceptual diagram illustrating an example option for computing separable transforms in a two-dimensional block of pixel residuals. FIG. 3B is a conceptual diagram illustrating an example option for computing non-separable transforms in a two-dimensional block of pixel residuals.

In the first option (e.g., FIG. 3A), called separable, the residuals are transformed separately, first in rows and then in columns (or vice-versa), as indicated by the arrows in FIG. 3A. More specifically, for each respective row of an N×N input block 60, a video encoder/decoder (generically referred to as video coder) produces a row of an intermediate block 62 by multiplying a vector consisting of elements of the respective row by an N×N transform matrix. For each respective column of intermediate block 62, the video coder produces a column of an output block by multiplying a vector consisting of elements of the respective column by an N×N transform matrix.

In the second type of block transformation (e.g., FIG. 3B), called non-separable, all residuals are put together into a single vector, as shown in FIG. 3B, and are transformed together. This option does not exploit the two-dimensional structure of the pixel blocks, but this option is more general and powerful, and can exploit directional features different from horizontal and vertical. For instance, for an input block 64 consisting of N×N values, the transform matrix is $N^2 \times N^2$. To determine an output block or vector 66, the video coder multiplies input block 64 by the transform matrix.

To minimize the computational complexity, video coding standards had been using only one block size and one type of separable transform (the DCT). With the recent adoption of HEVC, separable transforms are defined for several block sizes, and the Discrete Sine Transform (DST) has been adopted.

Even better compression can be achieved if a video encoder can test several different transforms, use the transform that yields best compression, and send an index t of the used transform to a video decoder, as shown in FIG. 2 (See Y. Ye and M. Karczewicz, "Improved H.264 intra coding based on bi-directional intra prediction, directional transform, and adaptive coefficient scanning," in *Proc. IEEE Int. Conf. Image Process.*, San Diego, Calif., October 2008, pp. 2116-2119; S. Takamura and A. Shimizu, "On intra coding using mode dependent 2D-KLT," in *Proc. 30th Picture Coding Symp.*, San Jose, Calif., December 2013, pp. 137-140; O. G. Sezer, O. G. Guleryuz, and Y. Altunbasak, "Approximation and compression with sparse orthonormal transforms," *IEEE Trans. Image Processing*, pp. 2328-2343, August 2015; and H. E. Egilmez, A. Said, Y.-H. Chao, and A. Ortega, "Graph-based transforms for inter predicted video coding," in *Proc. IEEE Int. Conf. Image Process.*, Quebec City, Canada, September 2015, pp. 3992-3996). In some examples, the index t may identify the transform by indicating the transform in a list of transforms.

This disclosure considers that an optimal KLT is derived by first computing, for each transform index t, a conditional residual correlation matrix $$C_t = E_{r|t}\{r\ r'\}. \qquad (1)$$

and then computing an orthogonal matrix $K_t$ that diagonalizes the correlation matrix, i.e., $$K_t C_t K_t' = D_t. \qquad (2)$$

Matrix $K_t$ is normally used directly for the computation of the vector of transform coefficients $y_t$ (FIG. 2), through the matrix-vector product $$y_t = K_t r. \quad (3)$$

Current matrix-based techniques for non-separable transforms may require excessive demands on memory and computation. Later parts of this disclosure explain how the techniques of this disclosure may address the problem.

Table I, below, shows the computational complexity of the different types of 2-D linear transformations (the last row of Table 1 is explained in detail below). Since block sizes N are defined as powers of two, i.e., $N=2^B$, this translates into exponential complexity growth, and there can be considerable differences between the different transform types.

TABLE I

Memory and arithmetic operations complexity of different types 2-D block transforms ($2^B \times 2^B$ block) with P passes.

| Transform type | Memory | Operations | Operations/pixel |
|---|---|---|---|
| Fast, separable | $O(B\ 2^B)$ | $O(B\ 2^{2B})$ | $O(B)$ |
| Matrix-based, separable | $O(2^{2B})$ | $O(2^{3B})$ | $O(2^B)$ |
| Matrix-based, non-separable | $O(2^{4B})$ | $O(2^{4B})$ | $O(2^{2B})$ |
| CMPT, non-separable | $O(P\ 2^{2B})$ | $O(P\ 2^{2B})$ | $O(P)$ |

In Table I, the relative measure of operations per pixel computed is considered, since only one transform is selected and used by a video decoder. The memory requirements, on the other hand, cannot be measured in relative terms, since all matrices have to be stored. It is also important to note that some video applications may require hundreds or thousands of different matrices, which may need to be stored in expensive fast memory.

In early implementations of video coding only the simplest approaches, the fast separable transform, were practically feasible. Now, matrix-based non-separable transforms for small block sizes (e.g., 4×4 blocks) can be considered, but the requirements may grow too fast with block size, and may become prohibitive for larger blocks.

What is missing is a solution that efficiently implements non-separable transforms, in a way that does not have the same complexity growth as the matrix-based approach. Techniques of this disclosure may provide that type of solution.

Techniques of this disclosure are based on a specific type of feature present in the application of transform coding to video compression. In other applications, the complexity of matrix-vector operations can be reduced by using matrices that are sparse or have special structures. However, those techniques cannot be applied in the video coding case because matrices $K_t$ have to be orthogonal, and if complexity constraints are added directly to the matrices, their compression effectiveness may not be realized.

An example solution of this disclosure is based on the following. First, the technique does not try to compute exactly the KLT transform. Instead, the technique looks for a vector transformation $M_t(x)$ (i.e., a transformation that maps one vector to another vector of the same dimension) that only gives an approximation to the KLT, in the form:

$$z_t = M_t(r) \approx y_t = K_t r. \quad (4)$$

In the equation above, $z_t$ is the output of the transformation t and r is the residual data.

Second, the full matrix-vector product is replaced with a sequence of $P_t$ different vector transformations $M_{t,p}$ (called passes), each with parameter vector $h_{t,p}$, in the functional form $M_{t,p}(x, h_{t,p})$, and the final residual transformation is in the form:

$$z_t = M_{t,P_t}(M_{t,P_t-1}(\ldots M_{t,2}(M_{t,1}(r, h_{t,1}), h_{t,2}) \ldots, h_{t,P_t-1}), h_{t,P_t}). \quad (5)$$

Figure 4:
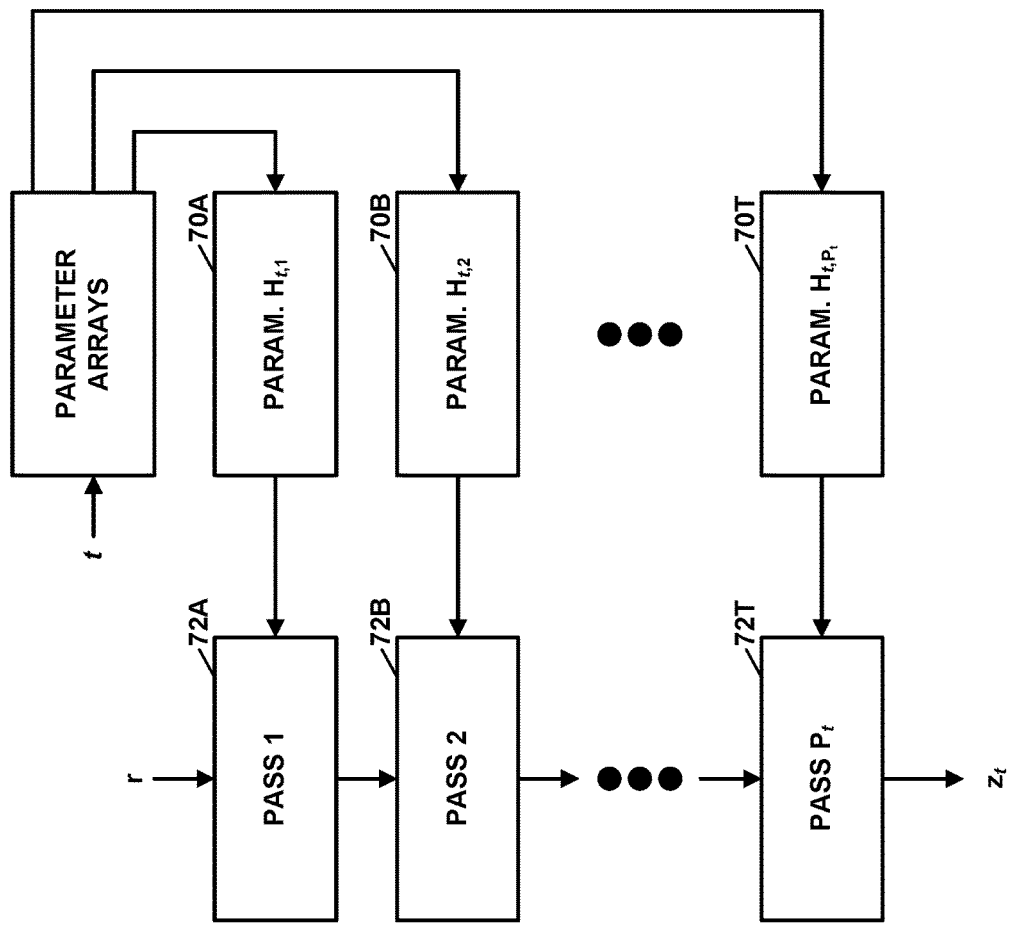
FIG. 4 is a conceptual diagram illustrating an example Compact Multi-Pass Transform implementation, in accordance with a technique of this disclosure.

The techniques of this disclosure cover this type of vector transformation with $P_t$ passes, which is referred to herein as the Compact Multi-Pass Transform (CMPT). An implementation of a CMPT is shown in the diagram of FIG. 4. In other words, FIG. 4 is a diagram of a Compact Multi-Pass Transform implementation, in accordance with a technique of this disclosure. For the purpose of this disclosure, the definition of a CMPT is quite general, but most of these general features may be needed in practice. For the complexity metrics shown in Table I, limitations on a CMPT for a transform on a vector of dimension N may be (1) The amount of memory to represent the set of parameters of a CMPT pass should be proportional to N; (2) each CMPT pass can be possibly computed in parallel using a number of processing elements proportional to N, each requiring a time (number of operations) that is independent of N (constant).

In the example of FIG. 4, a video coder applies a transform to an input block r. In instances where the video coder is encoding video data, the input block may comprise residual samples. In instances where the video coder is decoding video data, the input block may comprise transform coefficients. Furthermore, in the example of FIG. 4, the video coder determines a plurality of parameter arrays 70A-70T (collectively, parameter arrays 70) based on input t (e.g., index used to identify transform). In some examples, the video coder stores parameter arrays 70 in a memory or derives parameter arrays from data stored in a memory. Input t may indicate which transform to apply. In some examples, input t is an index into a list of transforms. Different transforms may be associated with different parameter arrays and/or different passes. In some examples, input t comprises one or more pieces of data that do not explicitly identify a transform. For instance, input t may comprise one or more of a block size, a prediction mode (e.g., intra or inter prediction), an intra prediction mode, and so on. In such examples, input t may not be an index into the list of transform, but some other information that can be used to determine the transform.

In the example of FIG. 4, to apply the transform, the video coder performs a series of passes 72A-72T (collectively, passes 72). Each respective pass of the series of passes transforms input data based on a respective parameter array of the determined plurality of parameter arrays. The input block r is the input data of the first pass of the series of passes. The input data of each pass of the series of passes other than the first pass is the output data of a previous pass of the series of passes. The output of the last pass of the series of passes is the transformed block $z_t$. As described elsewhere in this disclosure, each pass may comprise a set of orthogonal transformations, such as Givens orthogonal transforms. The video coder may perform the orthogonal transformations within a pass with concurrent (parallel) computations. For instance, sets of independent Givens transforms can be computed concurrently using several processors.

The optimal set of parameters $h_{t,p}$ may be found in various ways. For example, the optimal set of parameters $h_{t,p}$ may be found by performing a search of possible parameter values and identifying combinations of parameter values that tend to yield the best results. In this example, the search may be performed separate from the encoding or decoding process. The normative syntax may define:
1. Which are the transformations that are valid, and what are their allowed parameters;
2. A syntax defining how the encoder conveys the information about the transformation and respective parameters to be used for decoding.

In some examples, the optimal set of parameters may be precomputed and stored at each of video encoder 20 and video decoder 30.

Figure 5:
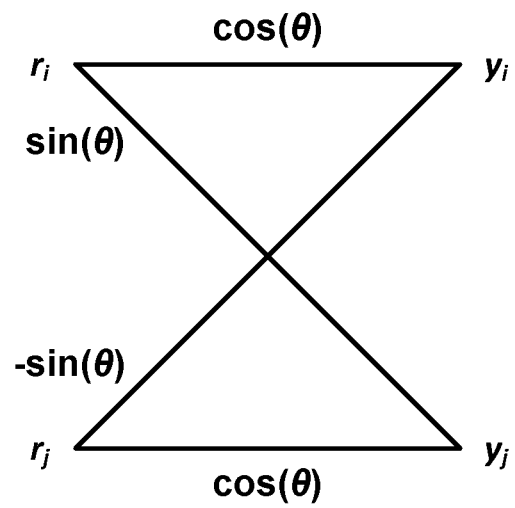
FIG. 5 is a "butterfly" diagram representing a Givens orthogonal transformation, parameterized by angle $\theta$, applied to a pair of vector elements, and the transformation equations, in accordance with a technique of this disclosure.

As an example, in one particular implementation of the CMPT, sequences of parallel Givens orthogonal transformations (rotations), applied to disjoint sets of pairs of vector elements, are used. FIG. 5 shows a "butterfly" diagram commonly used to represent such transformations, and its mathematical meaning. Thus, in the example of FIG. 5, the butterfly receives $r_i$ and $r_j$ as inputs and also receives a parameter $\theta$ as input. The outputs of the butterfly are $y_i$ and $y_j$. $y_i$ is calculated as $\cos(\theta)r_i - \sin(\theta)r_j$. $y_j$ is calculated as $\cos(\theta)r_j + \sin(\theta)r_i$. When applying an inverse transform, video decoder 30 may calculate $r_i$ as $y_i \cos(\theta) + y_j \sin(\theta)$ and $r_j$ as $-y_i \sin(\theta) + y_j \cos(\theta)$. Although FIG. 5, and other examples of this disclosure, are described with respect to Givens rotations, other transforms may be used instead of the Givens rotation, such as the Householder transformation, Euler rotations with 3 or more angles, and other transformations.

Figure 6:
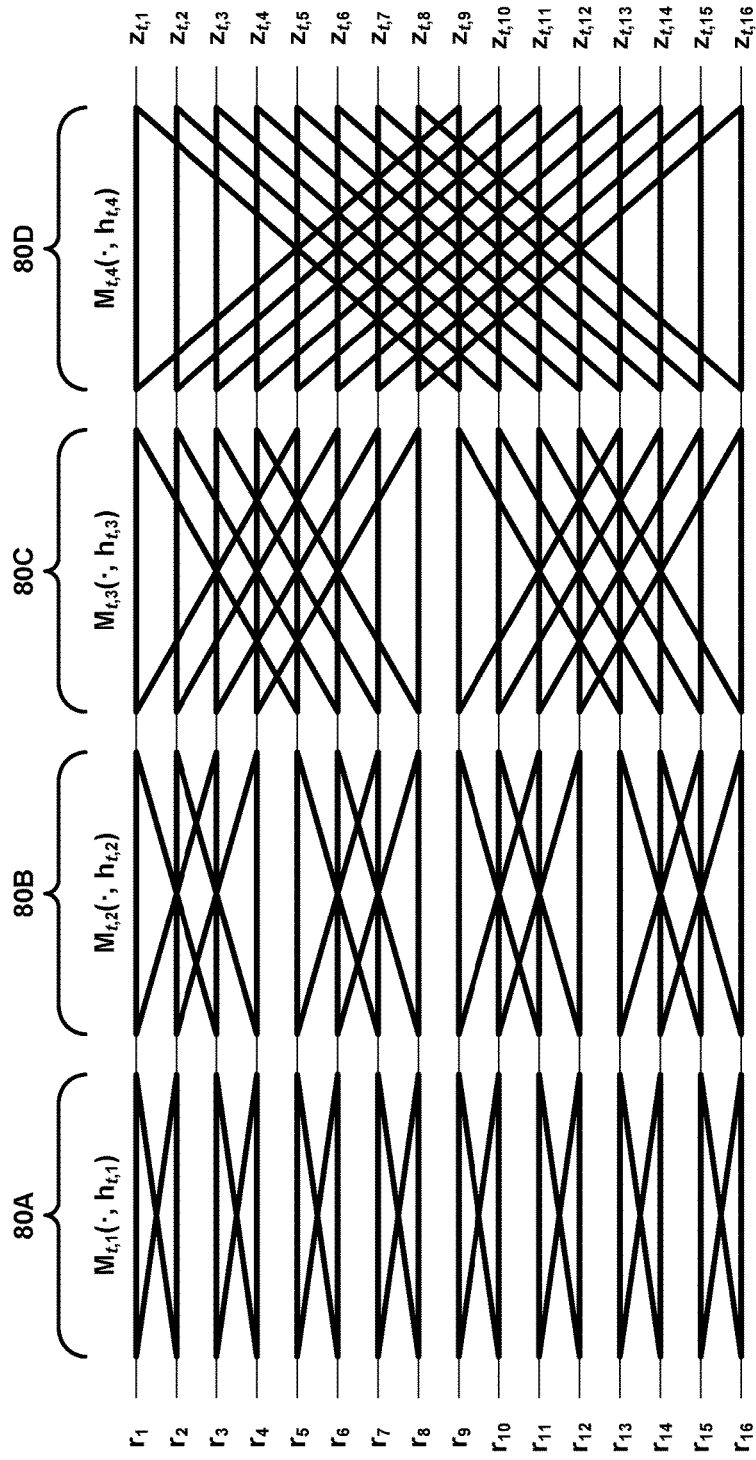
FIG. 6 is a diagram of a Compact Multi-Pass Transform implementation using sequences of parallel Givens rotation, on vectors of dimension 16, in accordance with a technique of this disclosure.

FIG. 6 is a diagram of a Compact Multi-Pass Transform implementation using sequences of parallel Givens rotation on vectors of dimension 16. The Givens rotations are parallel in the sense that the Givens rotations applied within one pass can be applied in parallel. Those Givens rotations can be arranged sequentially accordingly, for instance, to a hypercube topology, as shown in FIG. 6. The transform of FIG. 6 can be considered to have a hypercube topology in the sense that each of inputs may be considered a separate dimension. The example of FIG. 6 is a case that obtains the memory and operations complexity as shown in the last row of Table I. In the example of FIG. 5, the CMPT includes four passes, 80A, 80B, 80C, and 80D. However, in other examples, other numbers of passes are possible.

In the example of FIG. 6, the parameter vectors $h_{t,p}$ contain the different angles ($\theta$) to be used by each butterfly, in the corresponding pass. For example, the parameter vector $h_{t,1}$ may be {0°, 20°, 40°, 60°, 80°, 100°, 120°, 140°}, the parameter vector $h_{t,2}$ may be {5°, 25°, 45°, 65°, 85°, 105°, 125°, 145°}, and so on. Since only one angle per butterfly needs to be used, the parameter vectors have half of the dimension of the residual vector r. For instance, in the example of FIG. 6, since the residual vector r includes 16 samples, there are 8 parameters in each of the parameter vectors.

In some examples, video encoder 20 and video decoder 30 may use, and in some instances store, different parameter vectors for different transformations, different block sizes, and different passes. For example, video encoder 20 and video decoder 30 may use parameter vectors {0°, 20°, 40°, 60°} and {5°, 25°, 45°, 65°} with 8×8 blocks. Furthermore, in this example, video encoder 20 and video decoder 30 may use parameter vectors {2°, 22°, 42°, 62°, 82°, 102°, 122°, 142°}, {5°, 25°, 45°, 65°, 85°, 105°, 125°, 145°}, {7°, 27°, 47°, 67°, 87°, 107°, 127°, 147°}, and {0°, 20°, 40°, 60°, 80°, 100°, 120°, 140°} with 16×16 blocks.

In the example of FIG. 6, each butterfly corresponds to a Givens rotation shown in FIG. 5. Thus, in the example of FIG. 6, in each pass, eight Givens rotations are performed (e.g., in parallel). For each respective pass p, each of the Givens rotations in the respective pass may use a different parameter value (e.g., $\theta$) from the parameter vector for the respective pass ($h_{t,p}$). For example, for the top-left butterfly of FIG. 6, if the first parameter value in a parameter vector for round 1 (i.e., $h_{1,1}$) is equal to 45°, the outputs of the top-left butterfly are equal to )$\cos(45°)r_1 - \sin(45°)r_2$ and $\cos(45°)r_2 + \sin(45°)r_1$. In some examples, two or more of the Givens rotations in a pass may include the same parameter value (e.g., $\theta$).

Note in FIG. 6 that the structure of transformations $M_{t,p}(x, h_{t,p})$, changes with each pass. Thus, different results are obtained if the order of the parameters or transformations is changed. For example, different results may be obtained if the butterflies of pass 80B of FIG. 6 were swapped with the butterflies of pass 80A of FIG. 6.

In this way, video encoder 20 may determine residual values for a current block of a current picture of the video data. Additionally, video encoder 20 may apply a transformation to the residual values (e.g., r of FIG. 4, values $r_1 \ldots r_6$ of FIG. 6) for the current block to derive a plurality of data elements (e.g., $z_t$ of FIG. 4, values $z_{t,1}$ of FIG. 6) for the current block. As part of applying the transformation to the residual values for the current block, video encoder 20 applies a sequence of vector transformations (e.g., passes 72 of FIG. 4, passes 80 of FIG. 6). The input values for the first vector transformation (e.g., pass 72A of FIG. 4, pass 80A of FIG. 6) of the sequence of vector transformations comprise the residual values for the current block. Output values of the last vector transformation (e.g., pass 72T of FIG. 4, pass 80A of FIG. 6) of the sequence of vector transformations comprise the data elements for the current block. For each respective vector transformation of the sequence of vector transformations other than the first vector transformation of the sequence of vector transformations, input values for the respective vector transformation comprise output values of the respective previous vector transformation of the sequence of vector transformations. Each respective vector transformation of the sequence of vector transformations further takes, as input, a respective parameter vector (e.g., $h_{t,1} \ldots h_{t,Pt}$ in FIG. 4, $h_{t,1} \ldots h_{t,4}$ in FIG. 6) for the respective vector transformation, the respective parameter vector for the respective vector transformation comprising one or more parameters. Video encoder 20 may include, in a bitstream that comprises an encoded representation of the current picture, syntax elements having values based on the data elements for the current block.

Video decoder 30 may apply an inverse of the transform used in encoding. For instance, in the example of FIG. 6, $z_{t,1}$ through $z_{t,16}$ may serve as input to the transformation and $r_1$ through $r_{16}$ is output of the transformation. Where Givens orthogonal transformations are used, the inputs of the inverse Givens orthogonal transform are $y_i$ and $y_j$ and the outputs are $r_i$ and $r_j$, and $r_i = \cos(\theta)y_i + \sin(\theta)y_j$; $r_j = \cos(\theta)y_j - \sin(\theta)y_i$.

In this way, video decoder 30 may determine, based on syntax elements in a bitstream that comprises an encoded representation of a current picture of the video data, a plurality of data elements (e.g., transform coefficients, values $z_{t,1} - z_{t,16}$ in FIG. 6) for a current block of the current picture. Additionally, video decoder 30 may apply a transformation to the data elements to derive residual values (e.g., values $r_1 \ldots r_{16}$ in FIG. 6) for the current block. The transformation comprises a sequence of vector transformations (e.g., passes 72 of FIG. 4, passes 80 of FIG. 6). As shown in FIG. 6, input values for the first vector (e.g., pass 72A of FIG. 4, pass 80D of FIG. 6) transformation of the sequence of vector transformations comprise the plurality of data elements. Furthermore, as shown in FIG. 6, output values for the last vector transformation (e.g., pass 72T of FIG. 4, pass 80A of FIG. 6) of the sequence of vector transformations comprise the residual values for the current block. For each respective vector transformation of the sequence of vector transformations other than the first vector transformation of the sequence of vector transformations, input values for the respective vector transformation comprise output values of the respective previous vector transformation of the sequence of vector transformations. Furthermore, each respective vector transformation of the sequence of vector transformations further takes, as input, a respective parameter vector (e.g., $h_{t,1} \ldots h_{t,Pt}$ in FIG. 4, $h_{t,1} \ldots h_{t,4}$ in FIG. 6) for the respective vector transformation, the respective parameter vector for the respective vector transformation comprising one or more parameters. As described elsewhere in this disclosure, video decoder 30 may reconstruct, based on the derived residual data, samples of the current picture.

Various examples have been described. Particular examples of this disclosure may be used separately or in combination with one another.

Figure 7:
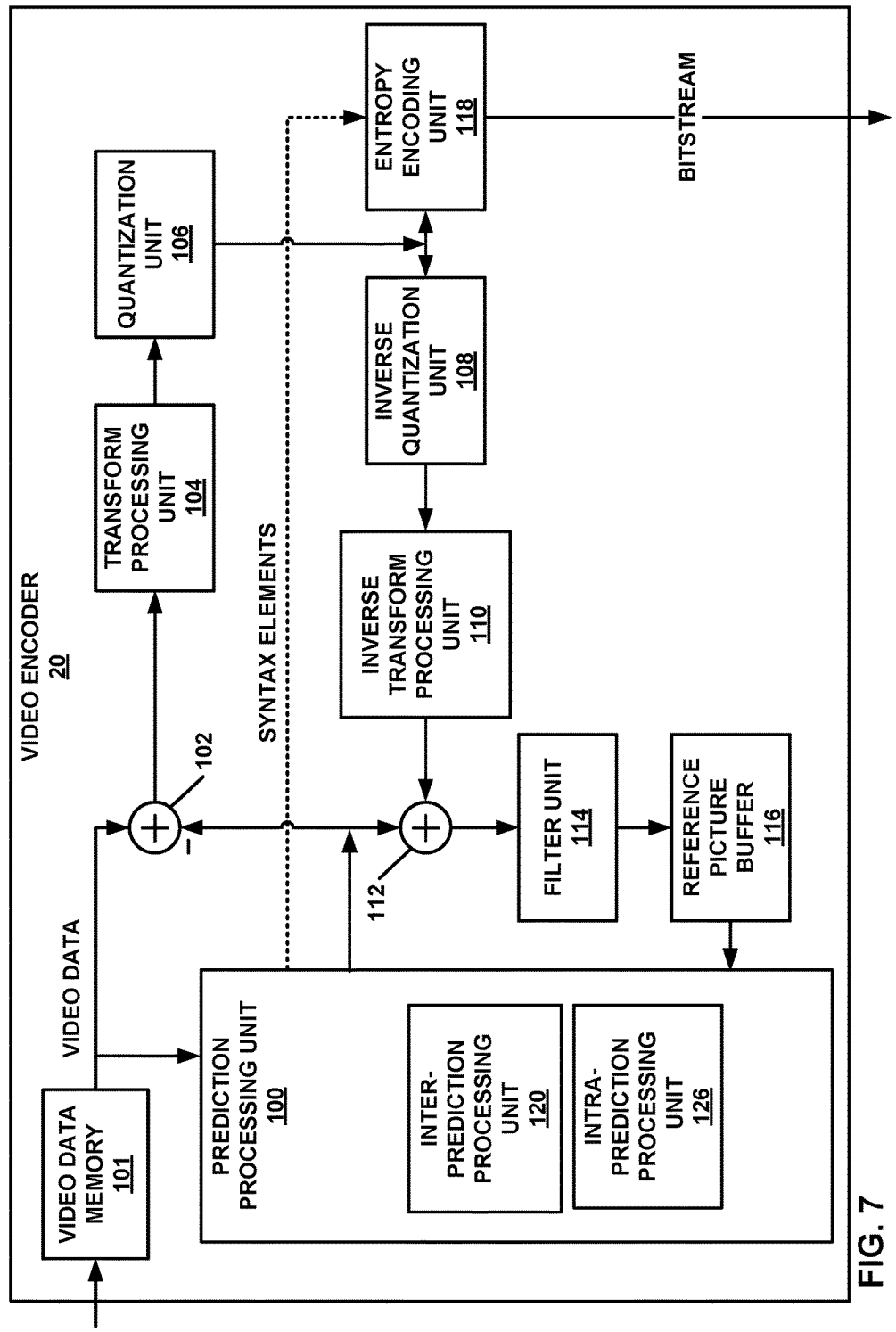
FIG. 7 is a block diagram illustrating an example of a video encoder.

FIG. 7 is a block diagram illustrating an example video encoder 20 that may implement the techniques of this disclosure. FIG. 7 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 7 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 7 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 7, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a reference picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Reference picture buffer 116 may be also be referred to as a decoded picture buffer. Reference picture buffer 116 stores reference video data for use in encoding video data by video encoder 20, e.g., in intra- or inter-coding modes. Video data memory 101 and reference picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and reference picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

In accordance with the techniques of this disclosure, transform processing unit 104 may implement the Compact Multi-Pass Transform (CMPT) techniques described elsewhere in this disclosure. For example, transform processing unit 104 may apply a transformation to the residual values for the current block to derive a plurality of data elements for the current block. In this example, applying the transformation to the residual values for the current block comprises applying a sequence of vector transformations. In this example, the input values for a first vector transformation of the sequence of vector transformations comprise the residual values for the current block. Furthermore, in this example, output values of a last vector transformation of the sequence of vector transformations comprise the data elements for the current block. In this example, for each respective vector transformation of the sequence of vector transformations other than the first vector transformation of the sequence of vector transformations, input values for the respective vector transformation comprise output values of the respective previous vector transformation of the sequence of vector transformations. Furthermore, in this example, each respective vector transformation of the sequence of vector transformations further takes, as input, a respective parameter vector for the respective vector transformation, the respective parameter vector for the respective vector transformation comprising one or more parameters.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Inverse quantization may restore the bit depths of transform coefficients. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Reference picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in reference picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 8:
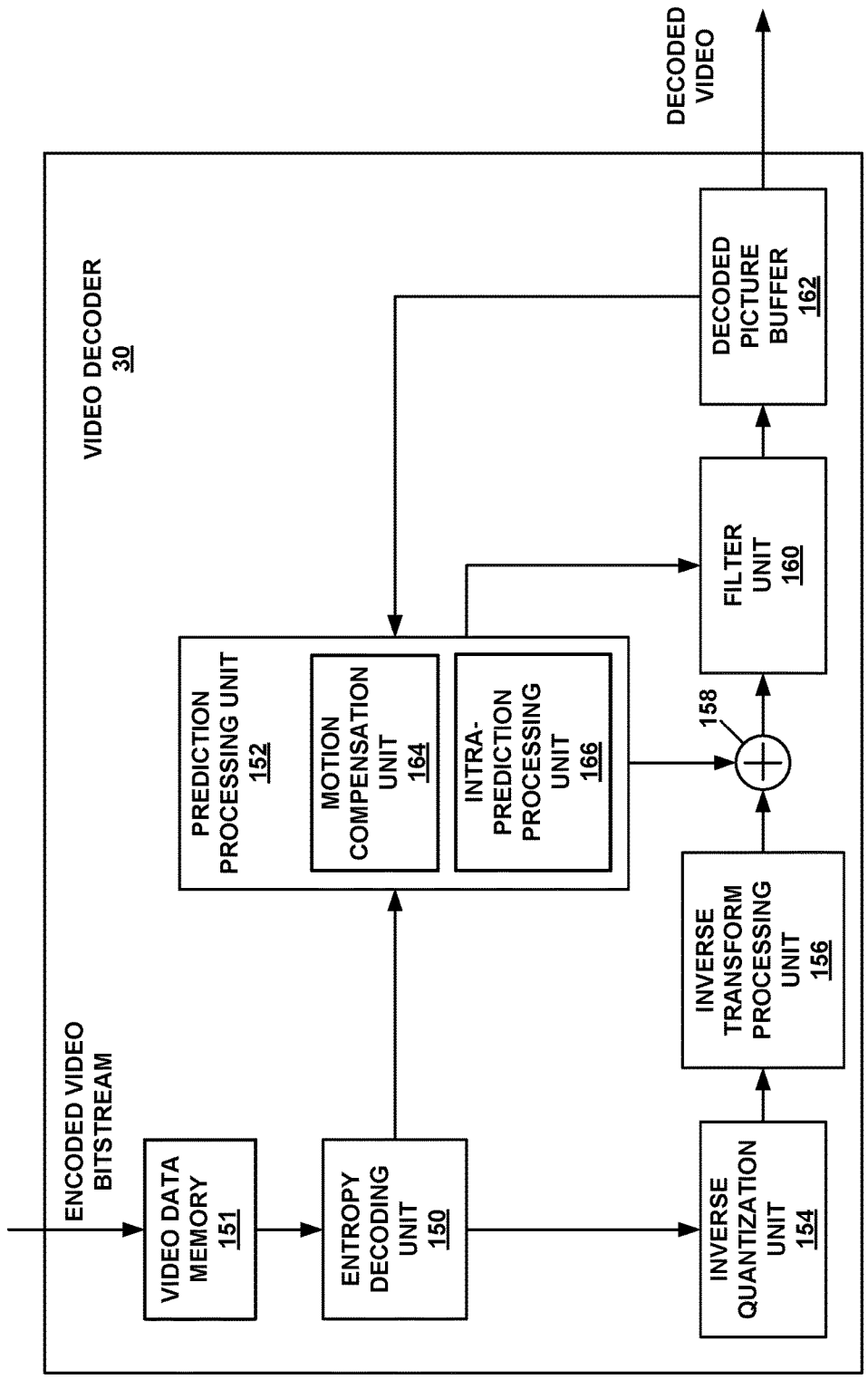
FIG. 8 is a block diagram illustrating an example of a video decoder.

FIG. 8 is a block diagram illustrating an example video decoder 30 that is configured to implement the techniques of this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 8 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 8 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 8, video decoder 30 includes an entropy decoding unit 150, video data memory 151, a prediction processing unit 152, an inverse quantization unit 154, an inverse transform processing unit 156, a reconstruction unit 158, a filter unit 160, and a reference picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Reference picture buffer 162 may also be referred to as a reference picture memory. Reference picture buffer 162 stores reference video data for use in decoding video data by video decoder 30, e.g., in intra- or inter-coding modes, or for output. Video data memory 151 and reference picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and reference picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse transform processing unit 156 may implement the Compact Multi-Pass Transform (CMPT) techniques described elsewhere in this disclosure. For example, inverse transform processing unit 156 may apply a transformation to data elements (e.g., transform coefficients) for the current block to derive residual values for a current block (e.g., TU). In this example, inverse transform processing unit 156 may apply the transformation to the transform coefficients for the current block at least in part by applying a sequence of vector transformations. In this example, the input values for a first vector transformation of the sequence of vector transformations comprise the transform coefficients for the current block. Furthermore, in this example, output values of a last vector transformation of the sequence of vector transformations comprise the residual values for the current block. In this example, for each respective vector transformation of the sequence of vector transformations other than the first vector transformation of the sequence of vector transformations, input values for the respective vector transformation comprise output values of the respective previous vector transformation of the sequence of vector transformations. Furthermore, in this example, each respective vector transformation of the sequence of vector transformations further takes, as input, a respective parameter vector for the respective vector transformation, the respective parameter vector for the respective vector transformation comprising one or more parameters.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in reference picture buffer 162. Reference picture buffer 162 may provide reference pictures for subsequent motion compensation, intra prediction, and presentation on a display device, such as display device 32 of FIG. 1. For instance, video decoder 30 may perform, based on the blocks in reference picture buffer 162, intra prediction or inter prediction operations for PUs of other CUs.

Figure 9:
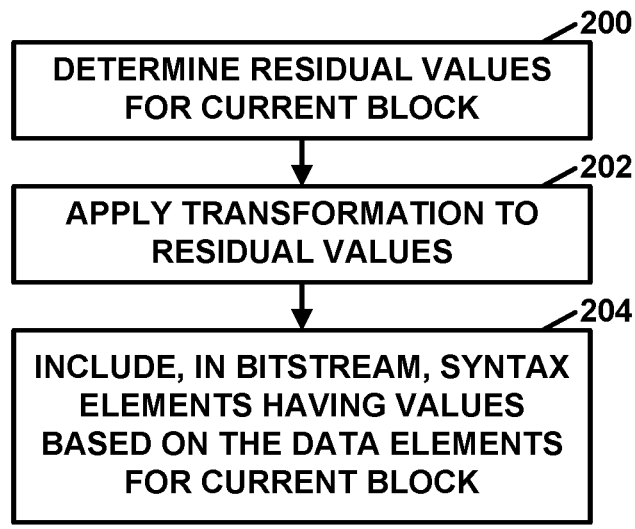
FIG. 9 is a flowchart illustrating an example operation of the video encoder for encoding video data, in accordance with a technique of this disclosure.

FIG. 9 is a flowchart illustrating an example operation of video encoder 20 for encoding video data, in accordance with a technique of this disclosure. In the example of FIG. 9, video encoder 20 determines residual values for a current block of a current picture of the video data (200). In the context of FIG. 7, residual generation unit 102 may determine the residual values for the current block. In some examples, video encoder 20 may determine the residual values for the current block by adding samples of a coding block to negative values of corresponding samples of a predictive block, or vice versa. In other examples, video encoder 20 may determine the residual values for the current block by subtracting samples of the predictive block from corresponding samples of the coding block, or vice versa. In some examples, the current block is a TU.

Furthermore, in the example of FIG. 9, video encoder 20 applies a transformation to the residual values for the current block to derive a plurality of data elements for the current block (202). In the context of FIG. 7, transform processing unit 104 may apply the transformation to the residual values for the current block. Video encoder 20 may apply the transformation to the residual values for the current block at least in part by applying a sequence of vector transformations. In this example, the input values for the first vector transformation of the sequence of vector transformations comprise the residual values for the current block. Furthermore, output values of a last vector transformation of the sequence of vector transformations comprise or consist of the data elements for the current block. The data elements may be transform coefficients. For each respective vector transformation of the sequence of vector transformations other than the first vector transformation of the sequence of vector transformations, input values for the respective vector transformation comprise or consist of output values of the respective previous vector transformation of the sequence of vector transformations.

Each respective vector transformation of the sequence of vector transformations further takes, as input, a respective parameter vector for the respective vector transformation. The respective parameter vector for the respective vector transformation comprises one or more parameters. For instance, in examples where the respective vector transformation comprises a set of Givens rotations, the respective vector transformation taking a parameter vector as input may comprise using parameters in the parameter vector as angle values $\theta$ (or values of $\sin(\theta)$ and $\cos(\theta)$) for each respective Givens rotations of the set of Givens rotations.

In some examples, for each respective vector transformation of the sequence of vector transformations, video encoder 20 stores pre-computed values of the parameters in the respective parameter vector for the respective vector transformation. For example, video encoder 20 may store pre-computed values of $\theta$ in a memory. In some examples, video encoder 20 stores pre-computed values of $\sin(\theta)$ and $\cos(\theta)$ in a memory.

In some examples, for each respective vector transformation of the sequence of vector transformations, the number of parameters in the respective parameter vector for the respective vector transformation is equal to one half of the number of input values for the respective vector transformation. For instance, in the example of FIG. 6, there are sixteen input values and eight butterflies per pass (i.e., vector transformation). Hence, there are eight values of the angle $\theta$ for each of the four passes of FIG. 6. The transform applied in FIG. 6 may be a non-separable transform. In other words, the transform applied in FIG. 6 is not applied to rows and columns of an input block separately.

In some examples, video encoder 20 may apply one or more Givens orthogonal transformations (i.e., Givens rotations). Each respective Givens orthogonal transformation of the one or more Givens orthogonal transformations may be applied to a respective pair of input values for the vector transformation. The respective Givens orthogonal transform is parameterized by a respective angle $\theta$. In such examples, at least one parameter value of the parameter vector for the vector transformation specifies a value of the respective angle $\theta$. In some examples, each parameter value of the parameter vector for the vector transformation specifies a respective value of the angle $\theta$. Furthermore, in some examples, each vector transformation of the sequence of vector transformations comprises one or more Givens orthogonal transformation parameterized by values of the angle $\theta$.

In some examples, video encoder 20 may select, from among a plurality of available transformations, the transformation to apply to the residual values for the current block. For example, video encoder 20 may try each of the available transforms and select the transform that yields the best results (e.g., in terms of number of bits). In some examples, video encoder 20 may signal the vector transformation in the sequence of vector transformations. For instance, video encoder 20 may include, in the bitstream, syntax element indicating the vector transformations.

Furthermore, in the example of FIG. 9, video encoder 20 may include, in a bitstream that comprises an encoded representation of the current picture, syntax elements having values based on the data elements for the current block (204). For example, video encoder 20 may quantize the data elements and generate one or more syntax elements that can be processed to determine values of the quantized data elements. For instance, video encoder 20 may generate a syntax element indicating whether a data element is non-zero, a syntax element indicating a sign of the data element, a syntax element indicating whether the data element is greater than 1, a syntax element indicating whether the data element is greater than 2, and a syntax element indicating a remainder value for the data element. In the context of FIG. 7, quantization unit 106 may quantize the data elements and entropy encoding unit 118 may generate the one or more syntax elements. Video encoder 20 may entropy encode (e.g., CABAC encode) one or more of the syntax elements. In the context of FIG. 1, output interface 24 may output the bitstream.

In some examples, video encoder 20 includes, in a bitstream, a syntax element indicating the transformation. Video encoder 20 may include the syntax element at various levels, such as a sequence level (e.g., in a VPS or SPS), a picture level (e.g., in a PPS), a slice level, a block level (e.g., a CTU, CU, TU level), or another level.

As indicated elsewhere in this disclosure, which transformations that are valid and their allowed parameters may be defined in a normative syntax. Hence, in some examples, for a vector transformation of the sequence of vector transformations, video encoder 20 may signal, in the bitstream, a set of valid transformations. The syntax elements may be signaled at various levels, such as a sequence level, picture level, slice level, block level, or another level. In some examples, video encoder 20 includes, in the bitstream, a syntax element indicating which of the valid transformations to apply.

In the example of FIG. 9, each respective vector transformation in the sequence of vector transformations may be a member of the set of valid transformations. For instance, video encoder 20 may include, in the bitstream, syntax elements indicating indices of valid transformations. The syntax element may be signaled at various levels, such as a sequence level, picture level, slice level, block level, or another level. Furthermore, for a vector transformation of the sequence of vector transformations, video encoder 20 may signal, in the bitstream, allowed parameters in the parameter vectors for the set of valid transformations. The allowed parameters for a valid transformation are the parameters used in the parameter vectors of the valid transformation. For example, the parameters may be angles of Givens rotations, which are quantized and represented with 8 bits. In this example, the allowed parameters are integer values in the range [0 . . . 255], covering angles from 0° to 255× (360°/256), and thus values that are negative or larger than 255 are not "allowed". The allowed parameters may be signaled at various levels, such as a sequence level, picture level, slice level, block level, or another level. For instance, video encoder 20 may include, in the bitstream, syntax elements indicating the allowed parameters.

Figure 10:
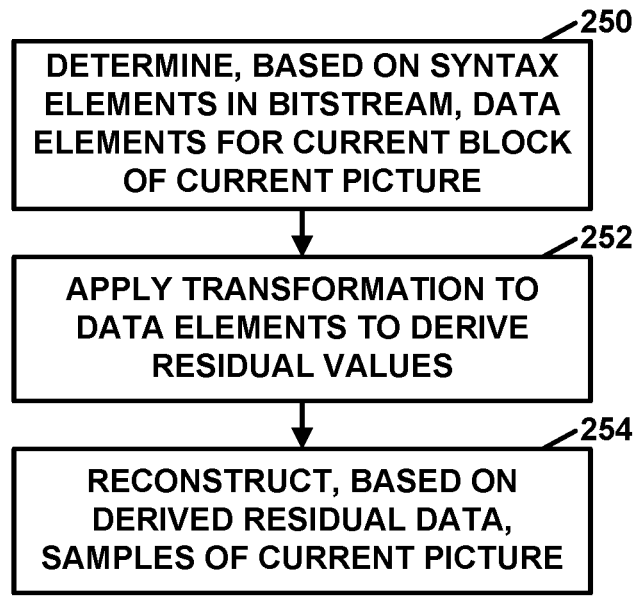
FIG. 10 is a flowchart illustrating an example operation of the video decoder for decoding video, in accordance with a technique of this disclosure.

FIG. 10 is a flowchart illustrating an example operation of video decoder 30 for decoding video, in accordance with a technique of this disclosure. In the example of FIG. 10, video decoder 30 may determine, based on syntax elements in a bitstream that comprises an encoded representation of a current picture of the video data, a plurality of data elements for a current block of the current picture (250). Each of the data elements may be a respective transform coefficient. In some examples, input interface 26 may receive the bitstream. Furthermore, in some examples, video decoder 30 may parse the bitstream to obtain the syntax elements from the bitstream. In this example, video decoder 30 may perform entropy decoding (e.g., CABAC decoding) to determine values of the syntax elements. In some examples, video decoder 30 may obtain one or more syntax elements for a data element in the plurality of data elements, such as a syntax element indicating whether the data element is non-zero, a syntax element indicating a sign of the data element, a syntax element indicating whether the data element is greater than 1, a syntax element indicating whether the data element is greater than 2, and a syntax element indicating a remainder value for the data element. In the example of FIG. 8, entropy decoding unit 150 may obtain the syntax elements. Furthermore, in some examples, to determine the plurality of data elements, video decoder 30 may inverse quantize the data elements. In the context of FIG. 8, inverse quantization unit 154 may inverse quantize the data elements. In some examples, the current block is a TU.

Furthermore, in the example of FIG. 10, video decoder 30 applies a transformation to the data elements to derive residual values for the current block (252). In the context of FIG. 8, inverse transform processing unit 156 may apply the transformation to the data elements to derive the residual values for the current block. The transformation comprises a sequence of vector transformations. In this example, input values for a first vector transformation of the sequence of vector transformations comprise or consist of the plurality of data elements. Furthermore, in this example, output values for a last vector transformation of the sequence of vector transformations comprise or consist of the residual values for the current block. For each respective vector transformation of the sequence of vector transformations other than the first vector transformation of the sequence of vector transformations, input values for the respective vector transformation comprise or consist of output values of the respective previous vector transformation of the sequence of vector transformations. In this example, each respective vector transformation of the sequence of vector transformations further takes, as input, a respective parameter vector for the respective vector transformation, the respective parameter vector for the respective vector transformation comprising one or more parameters.

In some examples, for each respective vector transformation of the sequence of vector transformations, the number of parameters in the respective parameter vector for the respective vector transformation is equal to one half of the number of input values for the respective vector transformation. The transform may be a non-separable transform.

In some examples, for each respective vector transformation of the sequence of vector transformations, video decoder 30 stores pre-computed values of the parameters in the respective parameter vector for the respective vector transformation. For example, video decoder 30 may store pre-computed values of θ in a memory. In some examples, video decoder 30 stores pre-computed values of sin(θ) and cos(θ) in a memory.

In some examples, one or more (e.g., each of the) vector transformations of the sequence of vector transformations comprises one or more inverse Givens orthogonal transformations, each of the one or more inverse Givens orthogonal transformations is applied to a respective pair of input values for the vector transformation. Each of the one or more inverse Givens orthogonal transformation is parameterized by a respective angle θ. The inverse Givens orthogonal transform may be of the form $r_i = \cos(\theta) y_i + \sin(\theta) y_j$; $r_j = \cos(\theta) y_j - \sin(\theta) y_i$. In this example, at least one parameter value of the parameter vector for the vector transformation may specify a value of the respective angle θ. For instance, each parameter value of the parameter vector for the vector transformation specifies a respective value of the angle θ.

In some examples, as part of applying the transformation, video decoder 30 may, for a vector transformation of the sequence of vector transformations, determine, based on one or more syntax elements in the bitstream, the parameter vector for the vector transformation. For instance, the video decoder 30 may look up the parameter vector in a lookup table or mathematically determine the parameter vector.

In the example of FIG. 10, video decoder 30 reconstructs, based on the derived residual data, samples of the current picture (254). For example, video decoder 30 may add samples of the residual data to corresponding samples of a predictive block to generate the samples of the current picture. For instance, in the context of FIG. 8, prediction processing unit 152 may generate one or more predictive blocks and reconstruction unit 158 may add samples of the one or more predictive blocks to corresponding samples of the residual data to generate the samples of the current picture. The samples of the current picture may be all or part of a coding block of a CU. Reconstruction may be lossy, depending on the amount of quantization applied. Thus, the output of the transformation by video encoder 20 may not exactly match output of the inverse transformation performed by video decoder 30.

In some examples, video decoder 30 determines, based on one or more syntax elements in the bitstream, the transformation. For example, video decoder 30 may obtain from the bitstream an index indicating the transformation. In some examples, video decoder 30 determines the transformation based on various information (e.g., block size, prediction mode, intra prediction direction, etc.). For instance, video decoder 30 may determine one transformation for inter prediction and another transformation for intra prediction.

Furthermore, in some examples, video decoder 30 may determine, based on one or more syntax elements in the bitstream, a set of valid transformations. The syntax elements may be signaled at various levels, such as a sequence level, picture level, slice level, block level, or another level. Each respective vector transformation in the sequence of vector transformations is a member of the set of valid transformations. For example, video decoder 30 may obtain, from the bitstream, syntax elements specifying the set of valid transformations. In such examples, video decoder 30 may obtain from the bitstream a syntax element indicating which of the valid transformations to apply. The syntax element may be signaled at various levels, such as a sequence level, picture level, slice level, block level, or another level.

Video decoder 30 may, for a vector transformation of the sequence of vector transformations, determine, based on one or more syntax elements in the bitstream, allowed parameters in the parameter vectors for the set of valid transformations. For example, video decoder 30 may obtain, from the bitstream, syntax elements specifying the allowed parameters in the parameter vectors. Furthermore, video decoder 30 may determine, based on one or more syntax elements in the bitstream, the vector transformations in the sequence of vector transformations. For instance, video decoder 30 may obtain, from the bitstream, one or more syntax elements specifying the vector transformations. Such syntax elements may indicate which parameters to use in each of the vector transformations as well as the structures of each of the vector transformations.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Hence, a processor may be formed by any of a variety of integrated processing circuitry comprising one or more processors implemented as fixed hardware processing circuitry, programmable processing circuitry and/or a combination of both fixed and programmable processing circuitry.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining, based on syntax elements in a bitstream that comprises an encoded representation of a current picture of the video data, a plurality of data elements for a current block of the current picture;
   applying a transformation to the data elements to derive residual values for the current block, wherein:
   the transformation comprises a sequence of vector transformations,
   input values for a first vector transformation of the sequence of vector transformations comprise the plurality of data elements,
   output values for a last vector transformation of the sequence of vector transformations comprise the residual values for the current block,
   for each respective vector transformation of the sequence of vector transformations other than the first vector transformation of the sequence of vector transformations, input values for the respective vector transformation comprise output values of the respective previous vector transformation of the sequence of vector transformations,
   each respective vector transformation of the sequence of vector transformations further takes, as input, a respective parameter vector for the respective vector transformation, the respective parameter vector for the respective vector transformation comprising one or more parameters, and
   each respective vector transformation of the sequence of vector transformations comprises one or more inverse Givens orthogonal transformations, each respective inverse Givens orthogonal transformation of the one or more inverse Givens orthogonal transformations being applied to a respective pair of input values for the respective vector transformation, the respective inverse Givens orthogonal transformations being parameterized by a respective angle $\theta$, and at least one parameter value of the parameter vector for the respective vector transformation specifies a value of the respective angle $\theta$; and
   reconstructing, based on the derived residual data, samples of the current picture.

2. The method of claim 1, wherein, for each respective vector transformation of the sequence of vector transformations, each parameter value of the parameter vector for the respective vector transformation specifies a respective value of the angle $\theta$.

3. The method of claim 1, further comprising determining, based on one or more syntax elements in the bitstream, a set of valid transformations, wherein each respective vector transformation in the sequence of vector transformations is a member of the set of valid transformations.

4. The method of claim 3, further comprising:
   for a vector transformation of the sequence of vector transformations, determining, based on one or more syntax elements in the bitstream, allowed parameters in the parameter vectors for the set of valid transformations.

5. The method of claim 1, further comprising determining, based on one or more syntax elements in the bitstream, the transformation.

6. The method of claim 1, wherein for each respective vector transformation of the sequence of vector transformations, the number of parameters in the respective parameter vector for the respective vector transformation is equal to one half of the number of input values for the respective vector transformation.

7. The method of claim 1, further comprising:
   for each respective vector transformation of the sequence of vector transformations, storing pre-computed values of the parameters in the respective parameter vector for the respective vector transformation.

8. A method of encoding video data, the method comprising:
   determining residual values for a current block of a current picture of the video data;
   applying a transformation to the residual values for the current block to derive a plurality of data elements for the current block, wherein applying the transformation to the residual values for the current block comprises applying a sequence of vector transformations, wherein:
   the input values for a first vector transformation of the sequence of vector transformations comprise the residual values for the current block,
   output values of a last vector transformation of the sequence of vector transformations comprise the data elements for the current block,
   for each respective vector transformation of the sequence of vector transformations other than the first vector transformation of the sequence of vector transformations, input values for the respective vector transformation comprise output values of the respective previous vector transformation of the sequence of vector transformations,
   each respective vector transformation of the sequence of vector transformations further takes, as input, a respective parameter vector for the respective vector transformation, the respective parameter vector for the respective vector transformation comprising one or more parameters,
   each respective vector transformation of the sequence of vector transformations comprises one or more inverse Givens orthogonal transformations, and
   applying the sequence of vector transformations comprises, for each respective vector transformation of the sequence of vector transformations, applying the one or more Givens orthogonal transformations of the respective vector transformation, wherein each respective Givens orthogonal transformation of the one or more Givens orthogonal transformations of the respective vector transformation is applied to a respective pair of input values for the respective vector transformation, the respective Givens orthogonal transform is parameterized by a respective angle θ, and at least one parameter value of the parameter vector for the respective vector transformation specifying a value of the respective angle θ, and including, in a bitstream that comprises an encoded representation of the current picture, syntax elements having values based on the data elements for the current block.

9. The method of claim 8, wherein, for each respective vector transformation of the sequence of vector transformations, each parameter value of the parameter vector for the respective vector transformation specifies a respective value of the angle θ.

10. The method of claim 8, further comprising signaling, in the bitstream, a set of valid transformations, wherein each respective vector transformation in the sequence of vector transformations is a member of the set of valid transformations.

11. The method of claim 10, further comprising:
for a vector transformation of the sequence of vector transformations, signaling, in the bitstream, allowed parameters in the parameter vectors for the set of valid transformations.

12. The method of claim 8, further comprising selecting, from among a plurality of available transformations, the transformation to apply to the residual values for the current block.

13. The method of claim 8, further comprising signaling, in the bitstream, the transformation.

14. The method of claim 8, wherein, for each respective vector transformation of the sequence of vector transformations, the number of parameters in the respective parameter vector for the respective vector transformation is equal to one half of the number of input values for the respective vector transformation.

15. The method of claim 8, further comprising, for each respective vector transformation of the sequence of vector transformations, storing pre-computed values of the parameters in the respective parameter vector for the respective vector transformation.

16. A device for decoding video data, the device comprising:
one or more storage media configured to store encoded video data; and
a video decoder configured to:
determine, based on syntax elements in a bitstream that comprises an encoded representation of a current picture of the video data, a plurality of data elements for a current block of the current picture;
apply a transformation to the data elements to derive residual values for the current block, wherein:
the transformation comprises a sequence of vector transformations,
input values for a first vector transformation of the sequence of vector transformations comprise the plurality of data elements,
output values for a last vector transformation of the sequence of vector transformations comprise the residual values for the current block,
for each respective vector transformation of the sequence of vector transformations other than the first vector transformation of the sequence of vector transformations, input values for the respective vector transformation comprise output values of the respective previous vector transformation of the sequence of vector transformations,
each respective vector transformation of the sequence of vector transformations further takes, as input, a respective parameter vector for the respective vector transformation, the respective parameter vector for the respective vector transformation comprising one or more parameters, and
each respective vector transformation of the sequence of vector transformations comprises one or more inverse Givens orthogonal transformations, each respective inverse Givens orthogonal transformation of the one or more inverse Givens orthogonal transformations being applied to a respective pair of input values for the respective vector transformation, the respective inverse Givens orthogonal transformations being parameterized by a respective angle θ, and at least one parameter value of the parameter vector for the respective vector transformation specifies a value of the respective angle θ; and
reconstruct, based on the derived residual data, samples of the current picture.

17. The device of claim 16, wherein, for each respective vector transformation of the sequence of vector transformations, each parameter value of the parameter vector for the respective vector transformation specifies a respective value of the angle θ.

18. The device of claim 16, wherein the video decoder is further configured to determine, based on one or more syntax elements in the bitstream, the transformation.

19. The device of claim 16, wherein for each respective vector transformation of the sequence of vector transformations, the number of parameters in the respective parameter vector for the respective vector transformation is equal to one half of the number of input values for the respective vector transformation.

20. The device of claim 16, further comprising a memory storing, for each respective vector transformation of the sequence of vector transformations, pre-computed values of the parameters in the respective parameter vector for the respective vector transformation.

21. A device for encoding video data, the device comprising:
one or more storage media configured to store video data; and
a video encoder configured to:
determine residual values for a current block of a current picture of the video data;
apply a transformation to the residual values for the current block to derive a plurality of data elements for the current block, wherein applying the transformation to the residual values for the current block comprises applying a sequence of vector transformations, wherein:
the input values for a first vector transformation of the sequence of vector transformations comprise the residual values for the current block,
output values of a last vector transformation of the sequence of vector transformations comprise the data elements for the current block,
for each respective vector transformation of the sequence of vector transformations other than the first vector transformation of the sequence of vector transformations, input values for the respective vector transformation comprise output values of the respective previous vector transformation of the sequence of vector transformations, each respective vector transformation of the sequence of vector transformations further takes, as input, a respective parameter vector for the respective vector transformation, the respective parameter vector for the respective vector transformation comprising one or more parameters, each respective vector transformation of the sequence of vector transformations comprises one or more inverse Givens orthogonal transformations, and the video encoder is configured such that, as part of applying the sequence of vector transformations, for each respective vector transformation of the sequence of vector transformations, the video encoder applies the one or more Givens orthogonal transformations of the respective vector transformation, wherein each respective Givens orthogonal transformation of the one or more Givens orthogonal transformation of the respective vector transformation is applied to a respective pair of input values for the respective vector transformation, the respective Givens orthogonal transform is parameterized by a respective angle θ, and at least one parameter value of the parameter vector for the respective vector transformation specifying a value of the respective angle θ; and include, in a bitstream that comprises an encoded representation of the current picture, syntax elements having values based on the data elements for the current block.

22. The device of claim 21, wherein, for each respective vector transformation of the sequence of vector transformations, each parameter value of the parameter vector for the respective vector transformation specifies a respective value of the angle θ.

23. The device of claim 21, wherein the video encoder is configured to select, from among a plurality of available transformations, the transformation to apply to the residual values for the current block.

24. The device of claim 21, further comprising signaling, in the bitstream, the transformation.

25. The device of claim 21, wherein, for each respective vector transformation of the sequence of vector transformations, the number of parameters in the respective parameter vector for the respective vector transformation is equal to one half of the number of input values for the respective vector transformation.

26. The device of claim 21, further comprising a memory storing, for each respective vector transformation of the sequence of vector transformations, pre-computed values of the parameters in the respective parameter vector for the respective vector transformation.

* * * * *